(12) United States Patent
Tsai

(10) Patent No.: US 8,444,332 B1
(45) Date of Patent: May 21, 2013

(54) LENS BARRIER DEVICE AND IMAGE PICKUP APPARATUS THEREOF

(75) Inventor: Yi-Yuan Tsai, Hemei Township (TW)

(73) Assignee: Altek Corporation (TW)

( * ) Notice: Subject to any disclaimer, the term of this patent is extended or adjusted under 35 U.S.C. 154(b) by 31 days.

(21) Appl. No.: 13/344,113

(22) Filed: Jan. 5, 2012

(30) Foreign Application Priority Data

Nov. 25, 2011 (TW) .............................. 100143221 A

(51) Int. Cl.
*G03B 17/00* (2006.01)
(52) U.S. Cl.
USPC ........................................................ 396/448
(58) Field of Classification Search
USPC ..................... 396/448, 348–349; 359/511
See application file for complete search history.

(56) References Cited

U.S. PATENT DOCUMENTS

| 6,264,380 | B1 * | 7/2001 | Omiya .......................... 396/448 |
| 6,381,075 | B2 * | 4/2002 | Nishimura et al. ........... 359/700 |
| 2001/0024573 | A1 * | 9/2001 | Nomura et al. ............... 396/448 |
| 2007/0217783 | A1 * | 9/2007 | Nishijima ..................... 396/448 |

* cited by examiner

*Primary Examiner* — Christopher Mahoney
(74) *Attorney, Agent, or Firm* — Wang Law Firm; Li K. Wang; Stephen Hsu

(57) ABSTRACT

A lens barrier device and an image pickup apparatus, comprising a moving barrel, a fixed barrel, a base plate, two vanes and a rotating plate. The base plate has a central window. Two vanes are inserted into the base plate and have a pivot and a control protrusion respectively. The rotating plate has a hollow part and two first grooves. A linking-up body is axially extended from the rotating plate, and has a first guiding protrusion. The moving barrel has a second guiding convex dot. The fixed barrel has a second groove and a third groove. The first guiding protrusion, the second guiding protrusion and the control convex dot are inserted into the first groove, the second groove and the third groove respectively. After the first guiding protrusion is driven, the rotating plate is linked to rotate to open or close the two vanes.

20 Claims, 6 Drawing Sheets

LENS BARRIER DEVICE AND IMAGE PICKUP APPARATUS THEREOF

CROSS-REFERENCE TO RELATED APPLICATION

This application claims the benefit of priority to Taiwan Patent Application No. 100143221, filed on Nov. 25, 2011, in the Taiwan Intellectual Property Office, the disclosure of which is incorporated herein in its entirety by reference.

BACKGROUND OF THE INVENTION

1. Field of the Invention

The present invention relates to a lens barrier device and an image pickup apparatus thereof, in particular to the lens barrier device and the image pickup apparatus using a slide groove to achieve the effect of driving and linking a plurality of vanes to open or close.

2. Description of the Related Art

As the optical technology advances and the related market has been promoted aggressively by major camera manufacturers in recent years, people record details of their daily life by using digital still cameras instead of the conventional recording method of writing dairy in the past. For the huge demand of this consumer market, it is an important subject for the major camera manufacturers to find a way of lowering the production cost and simplifying the production process of the camera.

In prior art, most lens barrier comprise a spring which drives vanes elastically to open or close the vanes. However, the spring may become elastically fatigued after a long time of use, and the assembling process for the barrier with spring not only requires more time and labor, but also incurs a higher production cost. In addition, for extendable and contractible part, the lens is generally designed as an independent mechanism, so that the vanes of the lens cannot be correspondingly opened or closed while a lens barrel is extended or contracted, and needs an additional driving module for driving the lens to be extended or contracted. Obviously, the conventional method has the drawbacks of involving a complicated assembling procedure of the camera and increasing the production cost.

In view of the drawbacks of the conventional method, manufacturers try to design and develop an ideal lens barrier device that can be integrated with the operations of opening or closing the lens barrier as well as extending or contracting the lens, so as to overcome the high production cost and the waste of manufacturing time caused by the complicated lens barrier structure and independent lens extending and contracting structure of a conventional camera. The inventor of the present invention designed a zooming lens mechanism and an image pickup device to overcome the drawbacks of the prior art and to improve the industrial applications.

SUMMARY OF THE INVENTION

Therefore, it is a primary objective of the present invention to provide a lens barrier device and an image pickup apparatus thereof to solve the aforementioned problems of the conventional lens requiring separate structures for the effects of opening or closing the vanes by a spring and extending or contracting the lens independently, and resulting in the waste of production cost and manufacturing time.

To achieve the aforementioned objective, the present invention further provides a lens barrier device, comprising: a barrier body, a moving barrel, and a fixed barrel. The barrier body further includes a base plate, two vanes, and a rotating plate. The base plate has a central window. The two vanes have a pivot and a control protrusion respectively, and the two vanes are pivotally embedded into the base plate. The rotating plate includes a hollow part disposed at a position corresponding to the central window, and two first grooves formed at positions opposite to the two control protrusions respectively, wherein the two control protrusions are passed and set in the two first grooves respectively, and when the rotating plate is rotated, a side of each first groove pushes each control protrusion to drive the two vanes to open or close the central window. A linking-up body is extended from the rotating plate axially and includes a first guiding convex dot formed thereon. The moving barrel is a hollow barrel structure having a second guiding convex dot formed on a periphery wall. The barrier body is disposed on a side of the moving barrel. The fixed barrel is also a hollow barrel structure sheathed on the periphery of the moving barrel and having a second groove and a third groove formed on the periphery wall of the fixed barrel. The second groove is sheathed on the first guiding convex dot, and the third groove is sheathed on the second guiding convex dot. The second groove is in a shape capable of guiding the first guiding convex dot to move to link the linking-up body and rotate the rotating plate when the moving barrel is slidably moved with respect to the fixed barrel, and the third groove is in a shape capable of driving the moving barrel to move axially through the second guiding convex dot.

Wherein, the linking-up body is in a shape of a long plate, and the first guiding convex dot is disposed at a rear end of the linking-up body.

Wherein, an end of the two vanes with the pivot is pivotally coupled to the base plate, such that the control protrusion at the other end of the two vanes is guided by the shape of the two first grooves to move.

Wherein, the second groove is in a shape of a linear groove coupled to an oblique groove and then coupled to a linear groove, and the third groove is in a shape of a linear groove.

Wherein, the first guiding convex dot is moved axially and obliquely along the second groove.

Wherein, the moving barrel has a notch formed at a position corresponding to the first guiding convex dot.

Wherein, the linking-up body is disposed in the moving barrel, and the first guiding convex dot is passed through the notch and set in the second groove.

Wherein, when the moving barrel is moved in a direction away from the fixed barrel, the two vanes are moved apart from each other to open the central window; and when the moving barrel is moved in a direction towards the fixed barrel, the two vanes are moved close to each other to cover the central window Wherein, when the driving module drives the first guiding convex dot to move along the shape of the second groove, the movement of the first guiding convex dot pushes the notch to drive the moving barrel to move.

Wherein, when the first guiding convex dot is moved along the shape of the second groove and into the oblique groove of the second groove, the first guiding convex dot is moved obliquely to link the linking-up body and rotate the rotating plate, and the rotation of the rotating plate makes a side of the two first grooves to push the control protrusion, so as to control the two vanes to open or close the central window.

To achieve the foregoing objective, the present invention further provides an image pickup apparatus comprising a barrier body and a lens barrel. The barrier body further comprises a base plate, two vanes, and a rotating plate. The lens barrel further comprises a moving barrel and a fixed barrel. The base plate has a central window. The two vanes have a pivot and a control protrusion respectively, and the two vanes are embedded into the base plate. The rotating plate has a hollow part corresponding to the central window and two first grooves opposite to the two control protrusions respectively. The two control protrusions are set in the two first grooves respectively, such that when the rotating plate is rotated, the two first grooves drive the two vanes to open or close through the two control protrusions to open or close the central window, and a linking-up body is extended axially from the rotating plate, and a first guiding convex dot is formed on the linking-up body. The moving barrel is a hollow barrel structure having a second guiding convex dot formed on a periphery wall of the moving barrel, and the barrier body is disposed on a side of the moving barrel. The fixed barrel is a hollow barrel structure sheathed on the periphery of the moving barrel and having a second groove and a third groove formed on a periphery wall of the fixed barrel, and the second groove is sheathed on the first guiding convex dot, and the third groove is sheathed on the second guiding convex dot, and the second groove is in a shape capable of guiding the first guiding convex dot to move to link the linking-up body and rotate the rotating plate when the moving barrel is slidably moved with respect to the fixed barrel, and the third groove has a shape capable of driving the moving barrel to move axially through the second guiding convex dot.

Wherein, when the lens barrel is extended, the two vanes open the central window, and when the lens barrel is contracted, the two vanes shut the central window.

Wherein, the linking-up body is in a shape of a long plate, and the first guiding convex dot is disposed at a rear end of the linking-up body.

Wherein, a side of the two vanes having the pivot is pivotally installed to the base plate, such that the two control protrusions of the two vanes can be moved along the two first grooves by using the pivot as the axis.

Wherein, the second groove is in a shape of a linear groove coupled to an oblique groove and then coupled to a linear groove, and the third groove is in a shape of a linear groove.

Wherein, the first guiding convex dot is moved obliquely along the second groove.

Wherein, the moving barrel has a notch formed at a position corresponding to the first guiding convex dot.

Wherein, the linking-up body is disposed in the moving barrel, and the first guiding convex dot is passed through the notch and set in the second groove.

Wherein, when the moving barrel is moved in a direction away from the fixed barrel, the two vanes are disposed apart from each other to open the central window; and when the moving barrel is moved in a direction towards the fixed barrel, the two vanes are disposed close to each other to cover the central window.

Wherein, the driving module is used for driving the first guiding convex dot, such that the first guiding convex dot is moved along the shape of the second groove, and the movement of the first guiding convex dot pushes the notch to drive the moving barrel to move.

Wherein, when the first guiding convex dot is moved along the shape of the second groove to the oblique groove of the second groove, the first guiding convex dot is moved obliquely to link the linking-up body and rotate the rotating plate, and the rotation of the rotating plate makes a side of the two first grooves to push the control protrusion, so as to control the two vanes to be opened or closed.

In summation of the description above, the lens barrier device and the image pickup apparatus in accordance with the present invention have one or more of the following advantages:

(1) The lens barrier device and the image pickup apparatus adopt the design of a slide slot, so that only one driving module is required for driving a lens and opening or closing vanes and extending or contracting a lens barrel to simplify the design of the lens module, so as to achieve the effect of lowering the production cost by reducing the number of components used.

(2) The lens barrier device and the image pickup apparatus adopt the design of a slide slot to substitute the traditional spring structure, so as to save the material cost and the assembling time of the spring, while minimizing the problem caused by the elastic fatigue and enhancing the production efficiency and capacity.

DESCRIPTION OF THE PREFERRED EMBODIMENTS

The technical characteristics of the present invention will become apparent with the detailed description of the preferred embodiments accompanied with the illustration of related drawings as follows. It is noteworthy to point out that the drawings are provided for the purpose of illustrating the present invention, but they are not necessarily drawn according to the actual scale, or are intended for limiting the scope of the invention.

The lens barrier device of the present invention primarily uses a single driving module (such as a motor) to open or close vanes of a lens and extend or contract the lens barrel, and the lens barrier device can be applied to an image pickup device such as a digital camera, a Smart phone, and a digital single-lens reflex camera, but the invention is not limited to such arrangements only.

Figure 1:
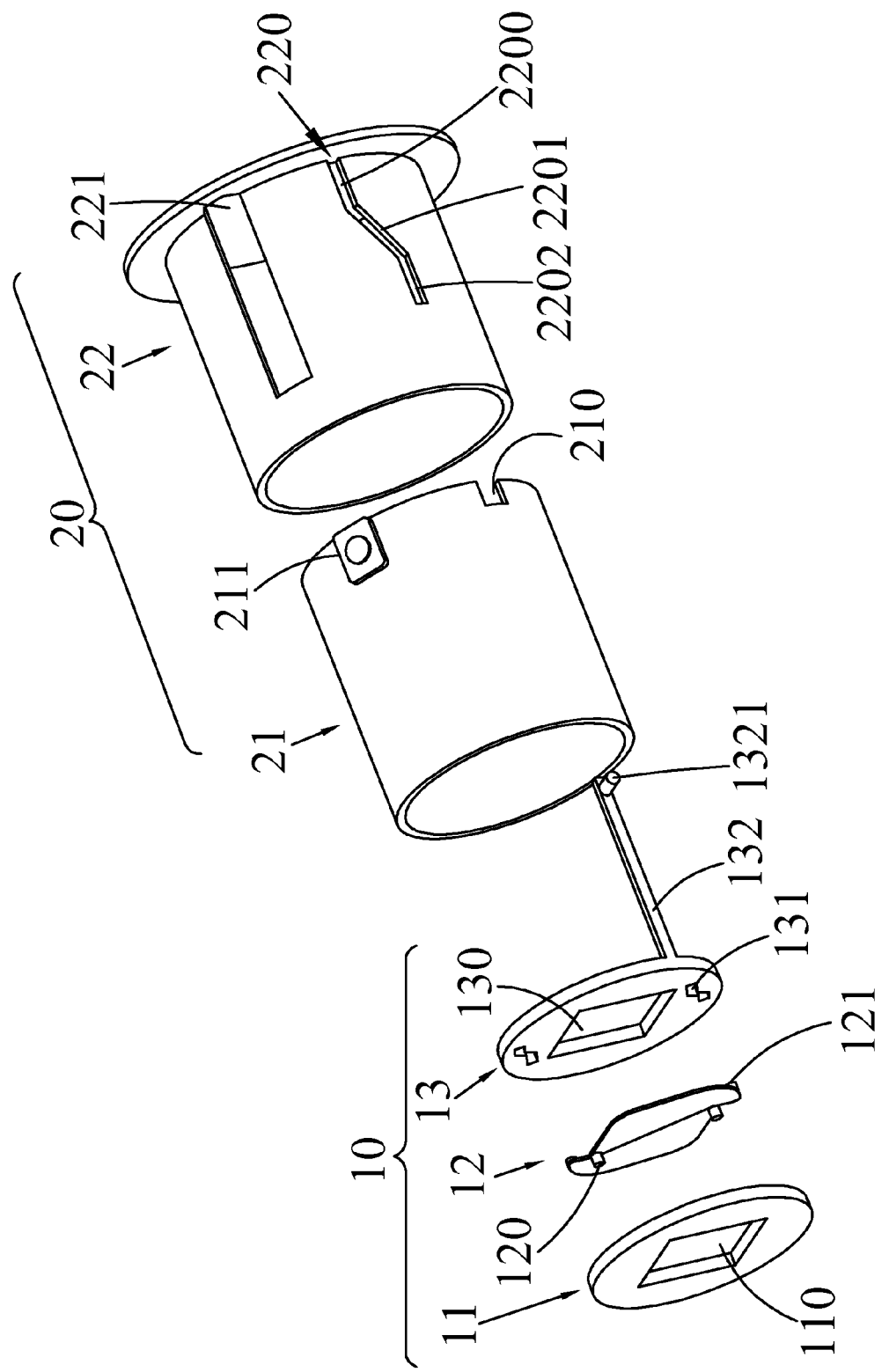
FIG. 1 is a schematic view of a lens barrier device of the present invention.
Figure 2:
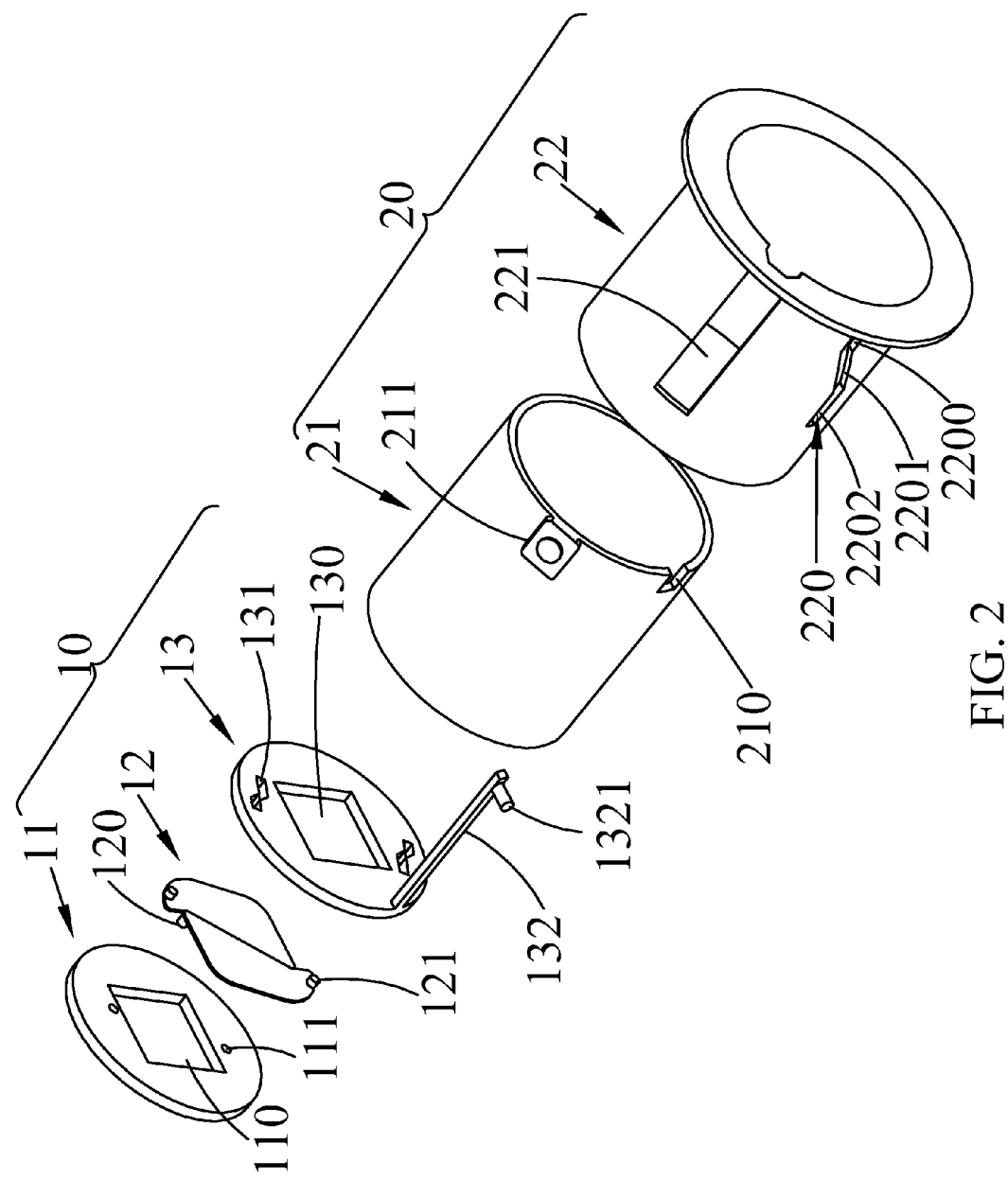
FIG. 2 is a schematic view of a lens barrier device of the present invention viewed from another angle.

With reference to FIGS. 1 and 2 for schematic views of a lens barrier device in accordance with the present invention respectively, the lens barrier device comprises a barrier body 10 and a lens barrel 20. The barrier body 10 further comprises a base plate 11, two vanes 12 and a rotating plate 13. The lens barrel 20 further comprises a moving barrel 21 and a fixed barrel 22. Wherein, the base plate 11 has a central window 110 formed at the center of the base plate 11 and two pivot holes 111 formed at the periphery of the base plate 11, and the two vanes 12 are installed on a side of the base plate 11, and a pivot 120 is installed on the vane 12 and proximate to a side of the base plate 11, and a control protrusion 121 is disposed on the other side of the base plate 11. Each pivot 120 is pivotally and separately embedded into the pivot hole 111, such that one side of the two vanes 12 is fixed onto the base plate 11. The rotating plate 13 has a hollow part 130 disposed at a position corresponding to the central window 110, and the two control protrusions 121 have two first grooves 131 respectively, wherein the two control protrusions 121 are passed and set into the two first grooves 131 respectively. A linking-up body 132 is extended axially from a lateral side of the rotating plate 13, and a first guiding convex dot 1321 is formed at a rear end of the linking-up body 132. Wherein, the rotating plate 13 can have a plurality of linking-up bodies 132 extended from the rotating plate 13, as needed, to improve the stability when the barrier body 10 is driven. Similarly, the second guiding convex dot 211, second groove 220 and third groove 221 can come with a plural quantity according to the actual requirements. In this preferred embodiment, one of each of the above is used, but the invention is not limited to such arrangement only.

The moving barrel 21 has a notch 210 formed on a periphery wall of the moving barrel 21, and a second guiding convex dot 211 formed on an external periphery wall, and the barrier body 10 is disposed on a side of the moving barrel 21. The fixed barrel 22 has a second groove 220 and a third groove 221 formed on a periphery wall of the fixed barrel 22, wherein the second groove 220 is sheathed on the first guiding convex dot 1321, and the third groove 221 is sheathed on the second guiding convex dot 211. The fixed barrel 22 is sheathed on the periphery of the moving barrel 21. Wherein, the second groove 220 is in a shape of a first linear groove 2200 coupled to an oblique groove 2201, and then coupled to a second linear groove 2202. Wherein, the first guiding convex dot 1321 can be an independent component or a component integrally formed with the linking-up body 132. This preferred embodiment adopts the integrated component, but the scope of the invention is not limited to such arrangement only.

Figure 3:
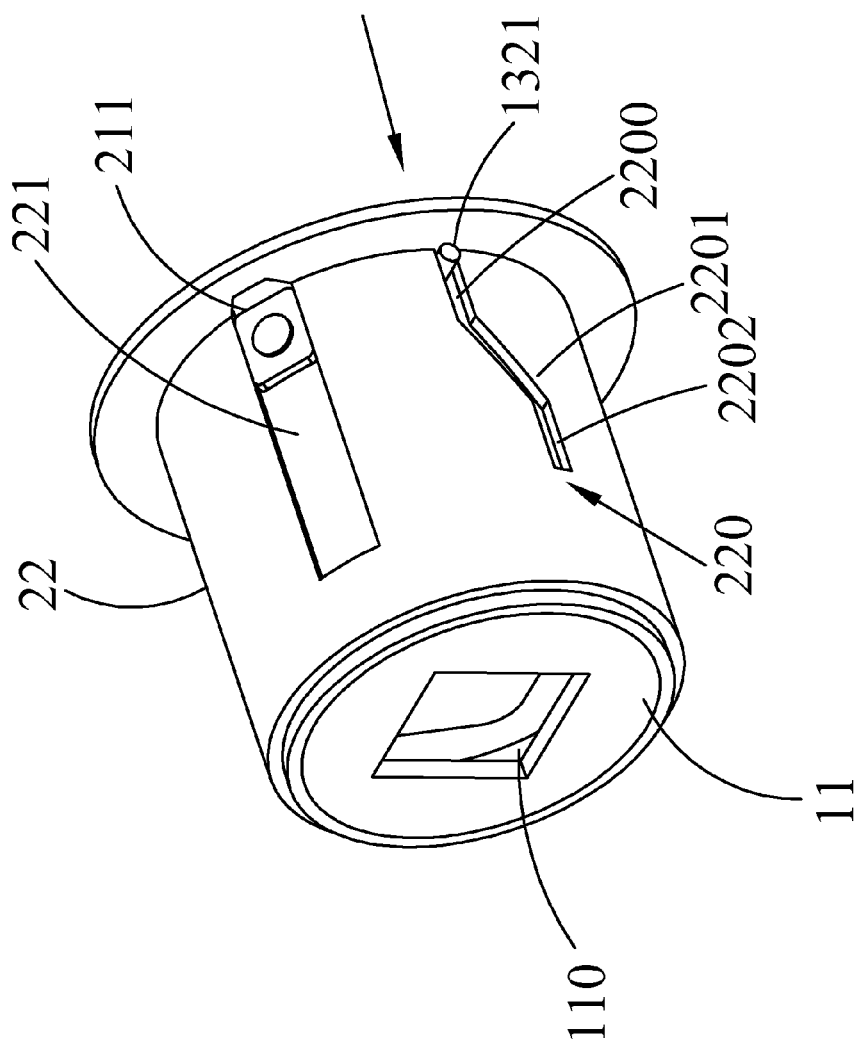
FIG. 3 is a first schematic view of operating a lens barrier device of the present invention.
Figure 4:
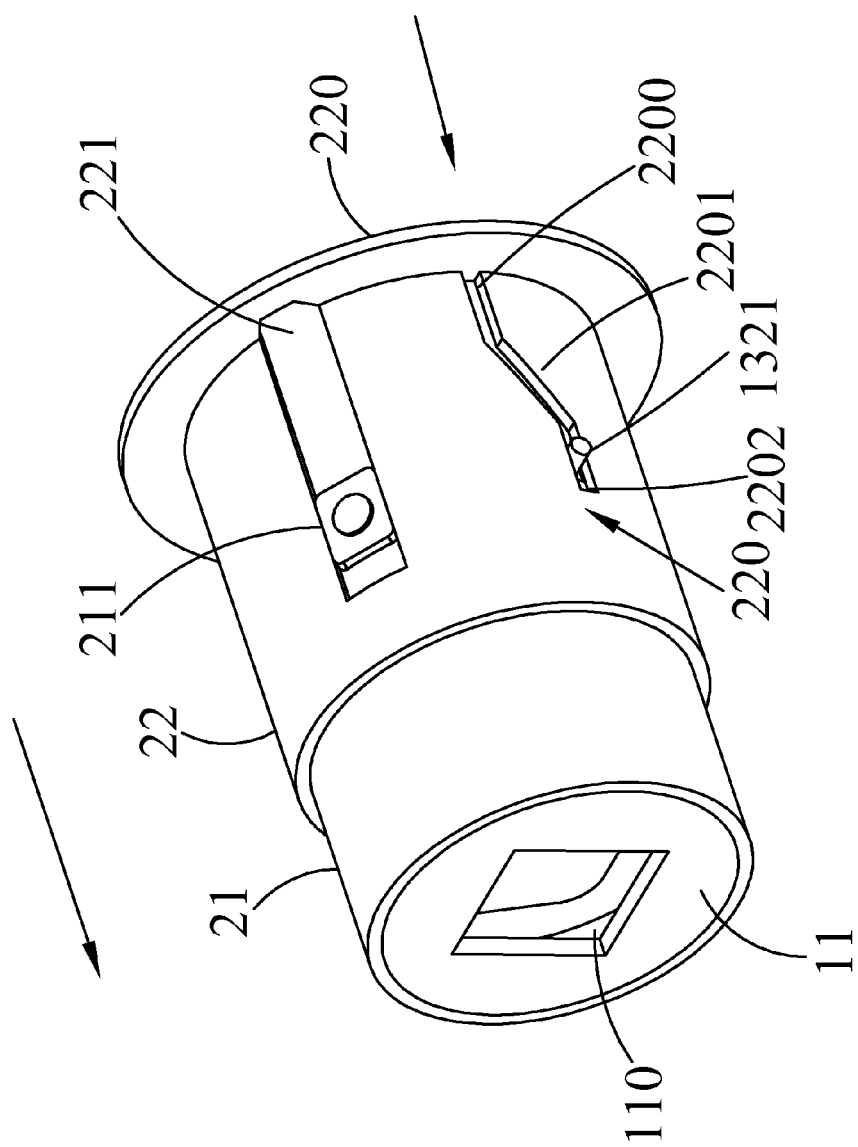
FIG. 4 is a second schematic view of operating a lens barrier device of the present invention.
Figure 5:
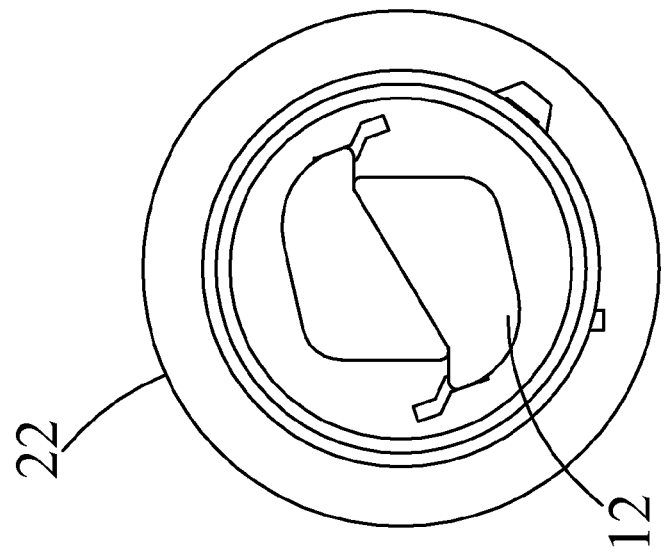
FIG. 5 is a schematic view of operating a vane of a lens barrier device of the present invention.
Figure 5:
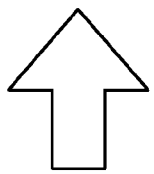
Figure 5:
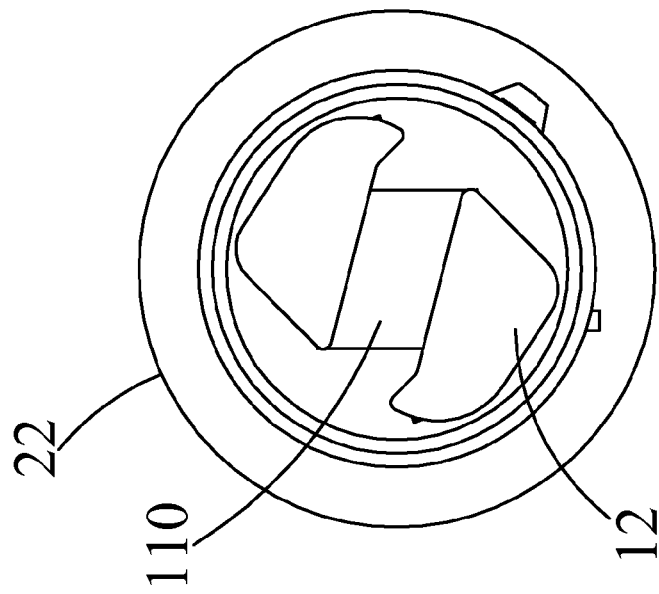

With reference to FIGS. 3, 4 and 5 for first and second schematic views of operating a lens barrier device of the present invention and a schematic view of operating a vane of a lens barrier device of the present invention respectively, if an external force is applied to push the first guiding convex dot 1321 in a direction away from the fixed barrel 22 (as indicated by the arrow in FIG. 3), the first guiding convex dot 1321 will move along the shape of the second groove 220. More specifically, the first guiding convex dot 1321 will be moved axially along the first linear groove 2200, and then moved obliquely along the oblique groove 2201, and finally moved axially with the second linear groove 2202. When the first guiding convex dot 1321 is moved obliquely along the oblique groove 2201, the first guiding convex dot 1321 will link and rotate the rotating plate 13. When the rotating plate 13 is rotated, a side of the two first grooves 131 will push and move the control protrusion 121, such that the two vanes 12 can be moved and rotated clockwise by using the two pivots 120 as an axis to open the central window 110. The first guiding convex dot 1321 is passed through the notch 210 and set into the second groove 220. Therefore, when the first guiding convex dot 1321 is moved along the second groove 220, a side of the notch 210 is pushed to drive the moving barrel 21 to move. In addition, the moving barrel 21 has a second guiding convex dot 211 formed on a periphery wall of the moving barrel 21. The second guiding convex dot 211 is passed and set in the third groove 221, such that when the moving barrel 21 is pushed by the first guiding convex dot 1321, the moving barrel 21 is restricted by the shape of the third groove 221 and can be moved axially only. Wherein, the shape of the two first grooves 131 is designed to achieve the effect of controlling the openness of the central window 110 by the two vanes 12, so as to control the amount of light entering into the lens barrier device, or this design is applied to a structure of an aperture or a shutter. In this preferred embodiment, only the lens barrier device is adopted for illustrating the present invention, but the practical applications are not limited to such arrangement only.

With reference to FIGS. 4 and 5, if a user wants to close the central window 110, the user can move the first guiding convex dot 1321 along the shape of the second groove 220. In other words, the first guiding convex dot 1321 will be moved axially along the second linear groove 2202, and then moved obliquely along the oblique groove 2201, and finally moved axially along the first linear groove 2200. Wherein, when the first guiding convex dot 1321 is moved obliquely in the oblique groove 2201, the rotating plate 13 is linked to move axially and rotate counterclockwise. While the rotating plate 13 is rotating, the other side of the two first grooves 131 pushes the two control protrusions 121, such that the two vanes 12 can be moved and rotated counterclockwise by using the two pivots 120 as an axis to close the central window 110. Since the rotating plate 13 is disposed on a side of the moving barrel 21, therefore when the first guiding convex dot 1321 links the rotating plate 13 to move, the rotating plate 13 drives the moving barrel 21 to move synchronously. Further, the second guiding convex dot 211 is passed and set in the third groove 221, and the movement of the second guiding convex dot 211 is restricted by the shape of the linear groove of the third groove 221, so that the moving barrel 21 can be moved axially in a stable manner. Wherein, the inclination of the oblique groove 2201 can be designed or adjusted according to the actual requirements. Different inclinations of the oblique groove 2201 can be used for controlling the extent of rotation of the rotating plate 13, or controlling the rotating speed of the rotating plate 13. The relative positions of the second groove 220 and the third groove 221 can be designed to adjust the level of extension and contraction of the lens barrel 20 and the openness of the two vanes 12 of the lens, but the invention is not limited to such arrangements only.

Figure 6:
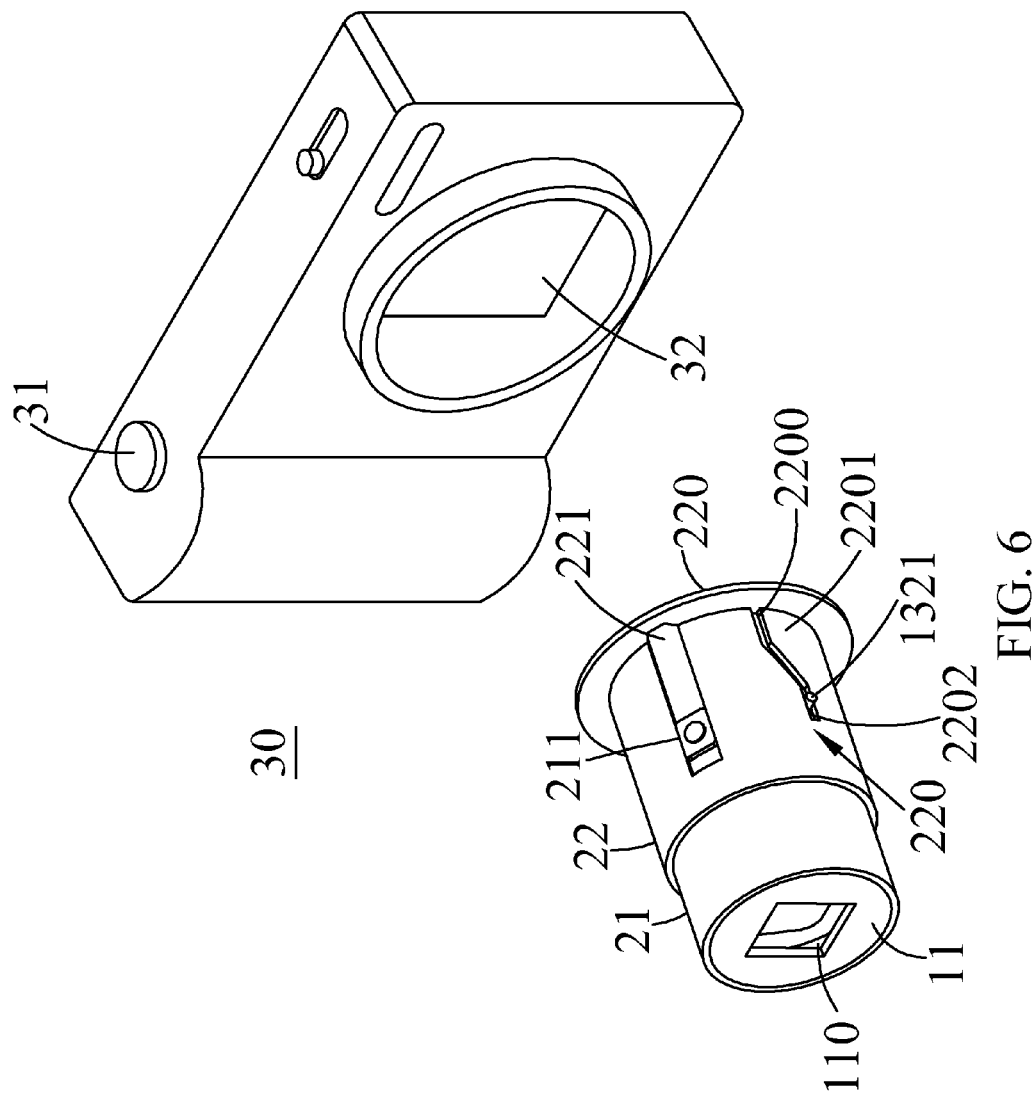
FIG. 6 is a schematic view of a lens barrier device in accordance with a first referred embodiment of the present invention.

With reference to FIG. 6 for a schematic view of a lens barrier device in accordance with the first preferred embodiment of the present invention, the lens barrier device can be applied in an image pickup apparatus 30, and the image pickup apparatus 30 can be a digital camera, a camera phone, a Smart phone, a digital video camera, or any portable electronic device with a photographic function. To make it easier to understand the technical characteristics of the present invention, a digital camera is used below for illustrating the present invention, but the invention is not limited to such arrangement only.

In this preferred embodiment, the connection and operation of the lens barrier device are the same as described above, and thus will not be described again. In the figure, the image pickup apparatus 30 comprises a barrier body 10 (wherein only the base plate 11 and the central window 110 are shown in the figure), a lens barrel 20 and an image sensor 32. The lens barrel 20 comprises a moving barrel 21 and a fixed barrel 22. If a user presses a power button 31 among the plurality of control buttons, a driving module (not shown in the figure) will push the first guiding convex dot 1321, such that the first guiding convex dot 1321 will be moved along the shape of the second groove 220. In other words, the first guiding convex dot 1321 will be moved along the first linear groove 2200, the oblique groove 2201 and the second linear groove 2202. If the first guiding convex dot 1321 is moved along the oblique groove 2201, the rotating plate 13 will be rotated clockwise, and if the two first grooves 131 are rotated clockwise accordingly, the two control protrusions 121 will be pushed, and the two control protrusions 121 pushed by the two first grooves 131 will make the two vanes 12 to open the central window 110.

While the first guiding convex dot 1321 is moving along the second groove 220, the first guiding convex dot 1321 pushes the notch 210, such that the moving barrel 21 will be moved with the first guiding convex dot 1321. Since the second guiding convex dot 211 is passed and set in the third groove 221 and the movement of the moving barrel 21 is restricted by the shape of the third groove 221, therefore when the first guiding convex dot 1321 is moved along the oblique groove 2201, the movement of the moving barrel 21 is restricted by the linear shape of the third groove 221, and the linear groove is parallel to the axis, so that the moving barrel 21 can be moved axially only. After a series of the aforementioned movements, the driving module drives the lens barrier device to separate the two vanes 12 apart, so as to open the central window 110, and allow the light of an object to be photographed to enter and project onto an image sensor 32 of the image pickup apparatus 30, and the driving module also drives the lens barrel 20 to extend and facilitate capturing an image. Wherein, the image sensor 32 can be a charge coupled device (CCD) or a complementary metal oxide semiconductor (CMOS).

If the user wants to turn off the camera, the aforementioned procedure is conducted in a reverse order, and thus will not be described. It is noteworthy to point out that when the first guiding convex dot 1321 is moved along the oblique groove 2201, the rotating plate 13 is moved and rotated counterclockwise, and the other side of the two first grooves 131 will be rotated counterclockwise accordingly to push the two control protrusions 121, so as to make the second control protrusion 121 to move by using the two pivots 120 as an axis, and the two vanes 12 close the central window 110. In addition, when the first guiding convex dot 1321 is moved axially and obliquely along the second groove 220, a side of the rotating plate 13 pushes the moving barrel 21, so that the moving barrel 21 will be moved accordingly, and the movement of the second guiding convex dot 211 is restricted by the linear shape of the third groove 221, and the linear groove is parallel to the axis, therefore the moving barrel 21 can be moved axially only. After a series of the aforementioned movements, the driving module drives the lens barrier device to close the central window 110 while retracting the lens barrel 20.

In summation of the description above, the lens barrier device and the image pickup apparatus of the present invention have the control protrusion arranged separately on the two vanes, and embedded into the first groove of the rotating plate, and the rotating plate has the linking-up body with the first guiding convex dot, and the first guiding convex dot is moved along the first groove. When the first guiding convex dot is moved along the oblique groove of the first groove, the rotating plate is driven to rotate, so that a side of the first groove pushes the control protrusion to close the two vanes. The foregoing method is used to substitute the conventional way of using a spring, so as to overcome the shortcomings of using the spring to control to open and close the vanes of the lens barrier device. In addition, the moving barrel has the notch formed at an end opening of the moving barrel, and the first guiding convex dot is passed and set into the notch. When the first guiding convex dot is driven to push the notch, the moving barrel will be moved accordingly. With this structural design, the vanes can be opened or closed while the lens barrel is extended or contracted. Therefore, the invention can improve another problem of the conventional lens barrel that requires a driving module to extend or contract the lens barrel. The present invention uses a multi-slide design to achieve the effect of opening or closing the vanes of the lens while extending or contracting the lens barrel by using a single driving module.

What is claimed is:

1. A lens barrier device, comprising:
    a barrier body, comprising:
        a base plate, having a central window;
        two vanes, each having a pivot and a control protrusion respectively, and the two vanes being pivotally embedded to the base plate; and
        a rotating plate, having a hollow part corresponding to the central window, two first grooves formed at positions opposite to the two control protrusions, and a linking-up body extended axially from the rotating plate and including a first guiding convex dot formed thereon; wherein the two control protrusions are passed and installed in the two first grooves respectively, and when the rotating plate is rotated, the two first grooves are provided for driving the two vanes to open through the two control protrusions, so as to open or cover the central window;
    a moving barrel, being hollow in structure, and having a second guiding convex dot formed at the periphery of the moving barrel, and the barrier body being disposed on a side of the moving barrel; and
    a fixed barrel, being hollow in structure, sheathed on the periphery of the moving barrel, and having a second groove and a third groove formed on a wall of the fixed barrel, and the second groove being sheathed on the first guiding convex dot, and the third groove being sheathed on the second guiding convex dot, and the second groove being provided for guiding the first guiding convex dot to move when the moving barrel slides with respect to the fixed barrel, so as to link the linking-up body and rotate the rotating plate, and the third groove being in a shape capable of driving the moving barrel to move through the second guiding convex dot.

2. The lens barrier device of claim 1, wherein the linking-up body is in a shape of a long plate, and the first guiding convex dot is disposed at a rear end of the linking-up body.

3. The lens barrier device of claim 1, wherein an end of the two vanes with the pivot is pivotally coupled to the base plate, such that the control protrusion at the other end of the two vanes is guided by the shape of the two first grooves to move.

4. The lens barrier device of claim 1, wherein the second groove is in a shape of a linear groove coupled to an oblique groove and then coupled to a linear groove, and the third groove is in a shape of a linear groove.

5. The lens barrier device of claim 4, wherein when the first guiding convex dot is driven, the first guiding convex dot is guided by the second groove to move, and the oblique groove being provided for the first guiding convex dot to move obliquely and link with and rotate the linking-up body and the rotating plate, such that the two first grooves are rotated by the rotating plate to push the control protrusion, so as to control the two vanes to be opened or closed.

6. The lens barrier device of claim 1, wherein the first guiding convex dot is moved axially and obliquely along the second groove.

7. The lens barrier device of claim 1, wherein the moving barrel has a notch disposed at a position corresponding to the first guiding convex dot.

8. The lens barrier device of claim 7, wherein the linking-up body is disposed in the moving barrel, and the first guiding convex dot is passed through the notch and set in the second groove.

9. The lens barrier device of claim 7, wherein when the first guiding convex dot is driven, the first guiding convex dot is guided by the second groove to move, and the first guiding convex dot is moved to push the notch and drive the moving barrel to move.

10. The lens barrier device of claim 1, wherein when the moving barrel is moved in a direction away from the fixed barrel, the two vanes are disposed apart from each other to open the central window; and when the moving barrel is moved in a direction towards the fixed barrel, the two vanes are disposed close to each other to cover the central window.

11. An image pickup apparatus, comprising:
a barrier body, including:
a base plate, having a central window;
two vanes, each having a pivot and a control protrusion respectively, and the two vanes being embedded into the base plate; and
a rotating plate, having a hollow part corresponding to the central window, and two first grooves opposite to the two control protrusions respectively, and the two control protrusions being set in the two first grooves respectively, such that when the rotating plate is rotated, the two first grooves drive the two vanes to open or close through the two control protrusions to open or cover the central window, and a linking-up body being extended axially out from the rotating plate, and a first guiding convex dot being formed on the linking-up body;
a lens barrel, including:
a moving barrel, being hollow in structure, and having a second guiding convex dot formed on a periphery wall of the moving barrel, and the barrier body being disposed on a side of the moving barrel; and
a fixed barrel, being hollow in structure, sheathed on the periphery of the moving barrel, and having a second groove and a third groove formed on a periphery wall of the fixed barrel, and the second groove being sheathed on the first guiding convex dot, and the third groove being sheathed on the second guiding convex dot, and the second groove having a shape capable of guiding the first guiding convex dot to move to link the linking-up body and rotate the rotating plate when the moving barrel is slidably moved with respect to the fixed barrel, and the third groove having a shape capable of driving the moving barrel to move axially through the second guiding convex dot.

12. The image pickup apparatus of claim 11, wherein the image pickup apparatus is integrated with opening or shutting the central window and extending or contracting the lens barrel, such that when the lens barrel is extended, the two vanes open the central window, and when the lens barrel is contracted, the two vanes shut the central window.

13. The image pickup apparatus of claim 11, wherein the linking-up body is in a shape of a long plate, and the first guiding convex dot is disposed at a rear end of the linking-up body.

14. The image pickup apparatus of claim 11, wherein the base plate is pivotally installed to a side of the two vanes having the pivot, such that the control protrusion on the other side of the two vanes is guided by the shape of the two first grooves to move.

15. The image pickup apparatus of claim 11, wherein the second groove is in a shape of a linear groove coupled to an oblique groove and then coupled to a linear groove, and the third groove is in a shape of a linear groove, and the first guiding convex dot is moved axially and obliquely along the second groove, and the second guiding convex dot is moved axially along the third groove.

16. The image pickup apparatus of claim 15, wherein when the first guiding convex dot is driven, the first guiding convex dot is guided by the second groove to move, and the oblique groove makes the first guiding convex dot to move obliquely and link the linking-up body and rotate the rotating plate, and the rotating plate is rotated to rotate the two first grooves to push the control protrusion, so as to control the two vanes to be opened and closed.

17. The image pickup apparatus of claim 11, wherein the moving barrel has a notch formed at a position corresponding to the first guiding convex dot.

18. The image pickup apparatus of claim 17, wherein the linking-up body is disposed in the moving barrel, and the first guiding convex dot is passed through the notch and set in the second groove.

19. The image pickup apparatus of claim 17, wherein when the first guiding convex dot is driven, the first guiding convex dot is guided by the second groove to move, and the first guiding convex dot is moved to push the notch and drive the moving barrel to move.

20. The image pickup apparatus of claim 11, wherein when the moving barrel is moved in a direction away from the fixed barrel, the two vanes are disposed apart from each other to open the central window; and when the moving barrel is moved in a direction towards the fixed barrel, the two vanes are disposed close to each other to cover the central window.

* * * * *